No. 623,860. Patented Apr. 25, 1899.
G. D. WOOD.
WHEEL TIRE.
(Application filed Feb. 21, 1899.)
(No Model.)
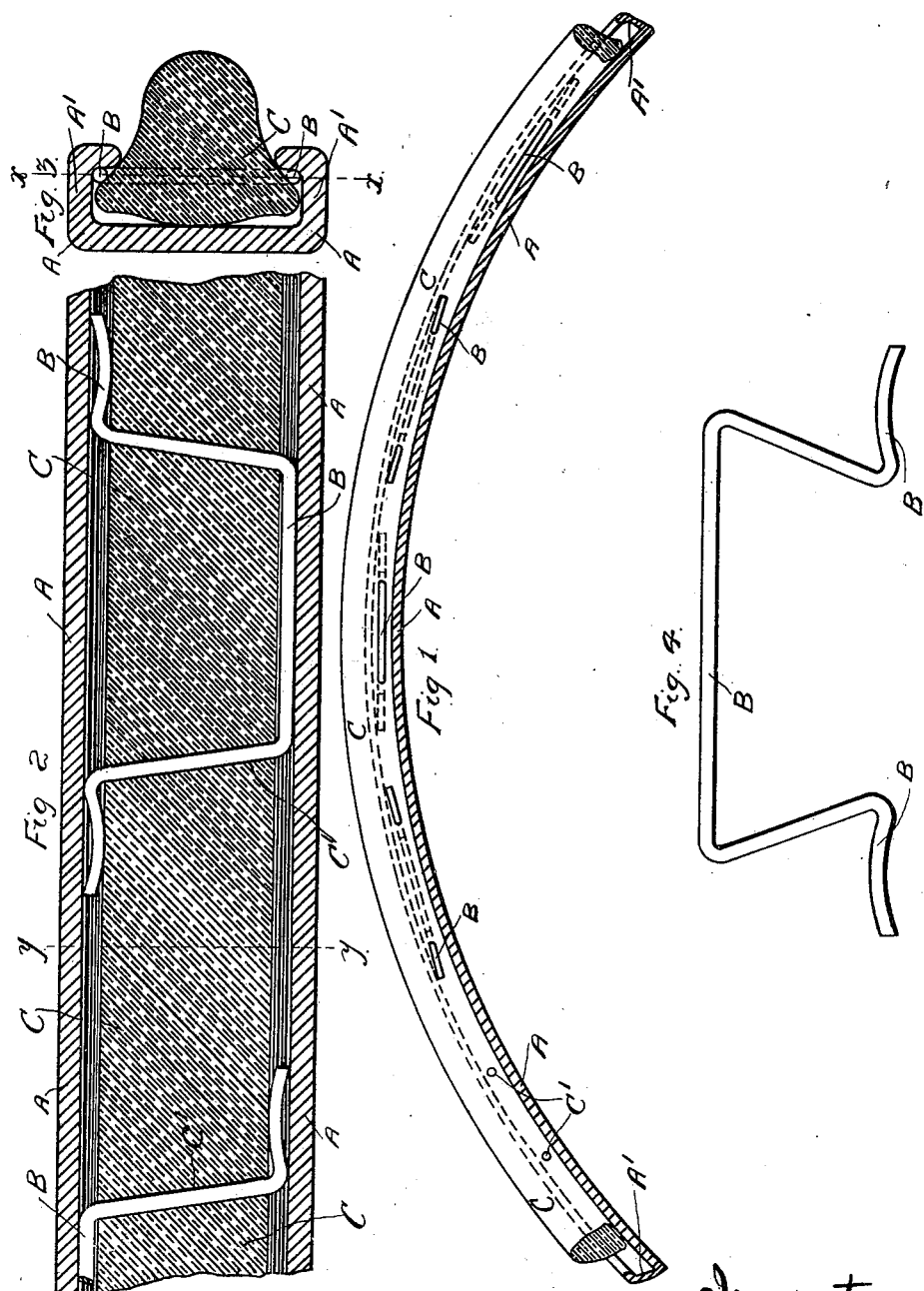
Witnesses.
J. C. Lebret.
A. Witt.
Inventor.
George D. Wood,
By H. A. de Vos.
Attorney.

UNITED STATES PATENT OFFICE.

GEORGE DICK WOOD, OF EDINBURGH, SCOTLAND.

WHEEL-TIRE.

SPECIFICATION forming part of Letters Patent No. 623,860, dated April 25, 1899.

Application filed February 21, 1899. Serial No. 706,309. (No model.)

*To all whom it may concern:*

Be it known that I, GEORGE DICK WOOD, residing at 67 Hanover street, in the city of Edinburgh, Scotland, have invented certain new and useful Improvements in Wheel-Tires, (patented in Great Britain on the 22d day of October, 1898, No. 22,239,) of which the following is a specification.

This invention, which relates to wheel-tires, has for its object the provision of improved means for securing the rubber tire or tread to the wheel-rim, the improvements being specially applicable to wheels of carriages and like road-vehicles.

The invention is illustrated by the accompanying drawings.

Figure 1 is a vertical section longitudinally of the tire, showing the improved method of fastening the rubber tread to the wheel-rim. Fig. 2 is a part section circumferentially of the tire on the line $x$-$x$, Fig. 3, and Fig. 3 a transverse vertical section on the line $y\,y$, Fig. 2, both figures being to a larger scale than Fig. 1. Fig. 4 shows a modified form of the securing-wire.

The wheel-rim A is or may be of the ordinary channel or clencher type, and the rubber tire or tread, instead of being secured by the dovetail flanges of the rim, which compress the base of the rubber C and detract from the resiliency of the tire or being wired on or being liable to slip or creep on the rim, is held within the channel or between the flanges A' of the rim by means of spring wires or rods B, which are threaded transversely through the rubber and bear against the side flanges A', so as to prevent the withdrawal of the tire after its insertion within the rim-channel.

A single wire may be threaded through the rubber tread, but by preference the spring wires or rods B are made in short lengths, as shown, which are fitted at intervals around the tire and are bent to approximately ⏛ form, as shown at Figs. 2 and 4, and passed through lateral orifices C' in the rubber C, then bent at their ends to lie longitudinally or circumferentially between the rubber tread C and the flanges A' of the rim. The wires B are preferably inserted alternately from opposite sides of the rubber, or they may be molded into the rubber C, so that the free ends of the alternate lengths bear on the opposite side flanges A' of the rim A and prevent any tendency toward creeping of the tire, while also insuring that the tire may not be accidentally detached from the rim.

In fitting the tire within the channel of the wheel-rim the projecting ends of the wires or rods are pressed inward by hand, and their resiliency causes them to spring outward and engage with the side flanges A' or lie within them when the flanges are undercut, as shown, or dovetailed.

Having now described the invention, what I claim, and desire to secure by Letters Patent, is—

The improved means for securing rubber tires or treads to wheel-rims consisting of a series of short lengths of wire bent to approximately ⏛ shape, and inserted in transverse orifices in the rubber tire, the ends of said wires bearing against the dovetailed or undercut side flanges of the rim substantially as described.

In witness whereof I have hereunto set my hand in presence of two witnesses.

GEORGE DICK WOOD.

Witnesses:
WALLACE FAIRWEATHER,
JOHN ARMSTRONG, Junr.